US008097670B2

(12) United States Patent
Nagai et al.

(10) Patent No.: US 8,097,670 B2
(45) Date of Patent: Jan. 17, 2012

(54) POLYACETAL RESIN COMPOSITION, PROCESS FOR PRODUCING THE SAME, AND SLIDING MEMBER MOLDED FROM THE RESIN COMPOSITION

(75) Inventors: Masayuki Nagai, Hiratsuka (JP); Yasuhiro Hirai, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 296 days.

(21) Appl. No.: 12/308,178

(22) PCT Filed: Jun. 12, 2007

(86) PCT No.: PCT/JP2007/061814
§ 371 (c)(1),
(2), (4) Date: Dec. 9, 2008

(87) PCT Pub. No.: WO2007/145211
PCT Pub. Date: Dec. 21, 2007

(65) Prior Publication Data
US 2009/0298981 A1    Dec. 3, 2009

(30) Foreign Application Priority Data
Jun. 15, 2006 (JP) .................................. 2006-166551

(51) Int. Cl.
*C08L 59/00* (2006.01)
*C10M 163/00* (2006.01)
(52) U.S. Cl. ......... 524/261; 524/502; 508/100; 508/107
(58) Field of Classification Search ........................ None
See application file for complete search history.

(56) References Cited

U.S. PATENT DOCUMENTS

| 3,704,275 | A | * | 11/1972 | Burg et al. | 524/425 |
|---|---|---|---|---|---|
| 3,865,897 | A | * | 2/1975 | Falender et al. | 525/100 |
| 4,645,785 | A | * | 2/1987 | Heinz et al. | 524/100 |
| 4,649,172 | A | * | 3/1987 | Yanase et al. | 524/413 |
| 4,873,282 | A | * | 10/1989 | Yui et al. | 524/496 |
| 4,874,807 | A | * | 10/1989 | Endo et al. | 524/267 |
| 4,879,331 | A | * | 11/1989 | Endo et al. | 524/267 |
| 5,106,896 | A | * | 4/1992 | Endo et al. | 524/318 |
| 5,173,532 | A | * | 12/1992 | Endo et al. | 524/425 |
| 5,177,123 | A | * | 1/1993 | Takayama et al. | 523/210 |
| 5,237,008 | A | * | 8/1993 | Kosinski | 525/154 |
| 5,306,772 | A | * | 4/1994 | Mimura et al. | 525/92 A |
| 5,346,737 | A | * | 9/1994 | Takahashi et al. | 428/36.9 |
| 5,415,791 | A | * | 5/1995 | Chou et al. | 508/103 |
| 5,482,987 | A | * | 1/1996 | Forschirm | 524/230 |
| 5,502,095 | A | * | 3/1996 | Ueshima et al. | 524/269 |
| 5,783,619 | A | * | 7/1998 | Shinohara | 524/318 |
| 5,942,568 | A | * | 8/1999 | Niino et al. | 524/405 |
| 6,147,146 | A | * | 11/2000 | Horio et al. | 524/100 |
| 6,284,828 | B1 | * | 9/2001 | Takayama | 524/413 |
| 6,316,534 | B1 | * | 11/2001 | Shimokusuzono et al. | 524/284 |
| 6,602,953 | B1 | * | 8/2003 | Horio et al. | 525/63 |
| 6,852,677 | B2 | * | 2/2005 | Kurz et al. | 508/100 |
| 7,491,771 | B2 | * | 2/2009 | Nishihara | 525/191 |
| 2005/0088782 | A1 | | 4/2005 | Horio et al. | |
| 2007/0105739 | A1 | * | 5/2007 | Wahl et al. | 510/295 |
| 2008/0038533 | A1 | * | 2/2008 | Best et al. | 428/220 |

FOREIGN PATENT DOCUMENTS

| JP | B 47-29374 | | 8/1972 |
|---|---|---|---|
| JP | B 52-28130 | | 7/1977 |
| JP | A 62-253650 | | 11/1987 |
| JP | 03163088 A | * | 7/1991 |
| JP | A 04-224856 | | 8/1992 |
| JP | A 04-239566 | | 8/1992 |
| JP | A 7-3118 | | 1/1995 |
| JP | A 10-237268 | | 9/1998 |
| JP | B2 2970691 | | 8/1999 |
| JP | A 2004-244536 | | 9/2004 |
| JP | 2004339271 A | * | 12/2004 |
| JP | A 2004-339271 | | 12/2004 |
| WO | WO 95/00585 A2 | | 1/1995 |
| WO | WO 03/055945 A1 | | 7/2003 |

OTHER PUBLICATIONS

Odian, "Principles of Polymerization" Third edition, John Wiley & Sons, Inc., 1991, two cover pages and p. 305.*
Machine-generated English-language translation of JP-2004-339271, translation generated on Apr. 2011, 15 pages.*
Notification of Reasons for Refusal issued in Japanese Patent Application No. 2007-154965; mailed Oct. 5, 2011; with English-language translation.

* cited by examiner

*Primary Examiner* — Robert Loewe
(74) *Attorney, Agent, or Firm* — Oliff & Berridge, PLC

(57) ABSTRACT

A polyacetal resin composition which has improved friction-wear characteristics as compared with conventional polyacetal resin compositions and which is less restricted in counter sliding members and can conform to a wide range of friction-wear conditions. A polyacetal resin composition comprising 100 parts by weight of (A) a polyacetal resin, 0.1 to 10 parts by weight of (B) a polyethylene wax having a number average molecular weight of 500 to 15,000, 0.1 to 10 parts by weight of (C) a polyethylene resin having a number average molecular weight of $2 \times 10^4$ to $50 \times 10^4$, and 0.1 to 5 parts by weight of (D) a silicone oil having a kinetic viscosity at 25° C. of $50 \times 10^4$ cSt or more.

4 Claims, No Drawings

POLYACETAL RESIN COMPOSITION, PROCESS FOR PRODUCING THE SAME, AND SLIDING MEMBER MOLDED FROM THE RESIN COMPOSITION

FIELD OF THE INVENTION

The present invention relates to a polyacetal resin composition which is suitable for use as a sliding part material such as a bearing, gear, cam, roller, sliding plate, pulley, lever or guide used in electric and electronic equipment, office equipment, automobiles and industrial equipment and which has excellent self-lubricating properties and slidability against various counter sliding materials, a process for producing the same and a polyacetal resin sliding member molded from the polyacetal resin composition.

DESCRIPTION OF THE PRIOR ART

A polyacetal resin has well balanced properties such as excellent friction-wear characteristics, heat resistance, chemical resistance and electric properties, it is widely used in the fields of automobiles and electric and electronic products as a sliding part material such as a gear. As for its practical application, it is often used in polyacetal resin parts which come into slide contact with each other. In general, when polyacetal resin parts come into slide contact with each other, it cannot be said that friction-wear characteristics are excellent, and a squeak noise is generated. Although a polyacetal resin of a lubricating grade having improved friction-wear characteristics has been put on the market and developed, the requirements from the above fields are becoming higher and higher, and the further improvement of friction-wear characteristics is desired.

As prior art technologies for improving the friction-wear characteristics of the polyacetal resin, there are known one in which a liquid ethylene•α-olefin random copolymer is added to a polyacetal resin (refer, for example, to Patent Document 1), one in which a polyethylene resin is added to a polyacetal resin (refer, for example, to Patent Document 2), one in which a lubricating oil such as super high molecular weight polyethylene and silicone oil is added to a polyacetal resin (refer, for example, to Patent Document 3) and one in which a polyethylene resin and a hydrocarbon-based oil are added to a polyacetal resin (refer, for example, to Patent Document 4). However, although a certain effect of improving friction-wear characteristics is observed at the time of general sliding, friction-wear characteristics such as a reduction in specific wear loss do not fully satisfy the requirements from the market of recent years.

There is also known a technology for reducing friction characteristics and noise at the time of sliding by mixing a polyethylene wax and a silicone oil with a polyacetal resin (refer, for example, to Patent Document 5).

Although the effect of improving friction-wear characteristics at the time of general sliding and friction-wear characteristics with the same composition is observed, the above technology does not satisfy the high requirements from the market of recent years for friction-wear characteristics for a counter sliding member, especially friction-wear characteristics such as a reduction in wear volume when the counter sliding member is made of a metal or glass fiber reinforced resin, and the further improvement of the friction-wear characteristics has been desired.

Patent Document 1: JP-A 04-239566
Patent Document 2: JP-A 62-253650
Patent Document 3: JP-B 47-029374
Patent Document 4: JP-B 52-028130
Patent Document 5: U.S. Pat. No. 2,970,691

DISCLOSURE OF THE INVENTION

Problems to be Solved by the Invention

It is an object of the present invention to provide a polyacetal resin composition which has improved friction-wear characteristics as compared with conventional polyacetal resin compositions, is less restricted in counter sliding member materials and can conform to a wide range of friction-wear conditions, a process for producing the same and a resin sliding member molded from the polyacetal resin composition.

Means for Solving the Problems

The inventors of the present invention have conducted intensive studies to solve the above problems and have found that the above object can be attained by adding predetermined amounts of a polyethylene wax, a silicone oil and a polyethylene resin as agents for improving friction-wear characteristics to a polyacetal resin.

They have also found that when a dispersion prepared by dispersing the silicone oil into the polyethylene resin out of the above components is mixed with the polyacetal resin and the polyethylene wax and melt kneaded with them, the friction-wear characteristics of the obtained polyacetal resin composition are improved more markedly. The present invention has been accomplished based on this finding.

According to a first aspect of the present invention, there is provided (i) a polyacetal resin composition comprising 100 parts by weight of (A) a polyacetal resin 0.1 to 10 parts by weight of (B) a polyethylene wax having a number average molecular weight of 500 to 15,000, 0.1 to 10 parts by weight of (C) a polyethylene resin having a number average molecular weight of $2 \times 10^4$ to $50 \times 10^4$ and 0.1 to 5 parts by weight of (D) a silicone oil having a kinetic viscosity at 25° C. of $50 \times 10^4$ cSt or more.

In the first aspect of the present invention, there are the following sub-aspects.

(ii) The above polyethylene wax (B) is at least one selected from (B1) a copolymer type polyethylene wax comprising 50 to 99 mol % of ethylene and 1 to 50 mol % of an α-olefin, (B2) an oxidation modified product of the polyethylene wax (B1), and (B3) an acid modified product of the polyethylene wax (B1).

(iii) The above polyethylene resin (C) is at least one selected from a low-density polyethylene having a density of 0.910 to 0.940 g/cm$^3$, a linear low-density polyethylene having a density of 0.910 to 0.940 g/cm$^3$-obtained by copolymerizing ethylene with an α-olefin, and a super low-density polyethylene having a density of 0.875 g/cm$^3$ or more and less than 0.910 g/cm$^3$.

According to a second aspect of the present invention, there is provided (iv) a process for producing a polyacetal resin composition comprising 100 parts by weight of (A) a polyacetal resin, 0.1 to 10 parts by weight of (B) a polyethylene wax having a number average molecular weight of 500 to 15,000, 0.1 to 10 parts by weight of (C) a polyethylene resin having a number average molecular weight of $2 \times 10^4$ to $50 \times 10^4$ and 0.1 to 5 parts by weight of (D) a silicone oil having a kinetic viscosity at 25° C. of $50 \times 10^4$ cSt or more, the process comprising mixing a dispersion prepared by dispersing the silicone oil (D) into the polyethylene resin (C) with other components and melt kneading them together.

In the second aspect of the invention, there are the following sub-aspects.

(v) The [C]/[D] weight ratio of the polyethylene resin (C) to the silicone oil (D) when the polyethylene resin (C) dispersion of the silicone oil (D) is to be obtained is 30/70 to 75/25 and the [(B)/((C)+(D))] weight ratio of the polyethylene wax (B) to the total of the polyethylene resin (C) and the silicone oil (D) is 0.01 to 4.

According to a third aspect of the present invention, there is provided (vi) a polyacetal resin sliding member molded from the polyacetal resin composition of any one of (i) to (iii).

Effect of the Invention

The polyacetal resin composition of the present invention and the polyacetal resin sliding member molded from the resin composition have extremely excellent friction-wear characteristics with a small wear loss. Especially the effect of improving not only friction-wear characteristics for a sliding member made of the above polyacetal resin composition but also friction-wear characteristics for a counter sliding member made of a metal or glass fiber reinforced resin is marked. The present invention can be advantageously used as a sliding part material such as a bearing, gear, cam, roller, sliding plate, pulley, lever or guide, etc. in a wide variety of fields such as electric and electronic equipment, office equipment, automobiles and industrial equipment and also as a part which requires friction-wear characteristics.

DETAILED DESCRIPTION OF THE PREFERRED EMBODIMENTS

[1] Polyacetal Resin Composition

The polyacetal resin composition according to the first aspect of the present invention will be described hereinbelow.
(1) Polyacetal Resin (A)

The polyacetal resin (A) used in the present invention is a polymer having an acetal structure (—O—CRH—) (R is a hydrogen atom or organic group) as a recurring structure. In general, it has an oxymethylene group (—$CH_2$O—) in which R is a hydrogen atom as the main constituent unit. The polyacetal resin used in the present invention includes an acetal homopolymer consisting of this recurring structure and a copolymer (for example, a block copolymer) and terpolymer containing at least one recurring constituent unit except the above oxymethylene group and may further have not only a linear structure but also branched and crosslinked structures.

Examples of the constituent unit except the above oxymethylene group include oxyalkylene groups having 2 to 10 carbon atoms which may be branched, such as oxyethylene group (—$CH_2CH_2$O—), oxypropylene group (—$CH_2CH_2CH_2$O—) and oxybutylene group (—$CH_2CH_2CH_2CH_2$O—). Out of these, an oxyalkylene group having 2 to 4 carbon atoms which may be branched is preferred, and an oxyethylene group is particularly preferred. The content of the oxyalkylene structural unit except the oxymethylene group is preferably 0.1 to 15 mol % of the polyacetal resin.

Any process for producing the polyacetal resin may be used in the present invention, and the polyacetal resin can be manufactured by any conventionally known process. For example, a polyacetal resin having an oxymethylene group and an oxyalkylene group having 2 to 4 carbon atoms as structural units can be manufactured by copolymerizing a cyclic oligomer of an oxymethylene group such as a trimer (trioxane) or tetramer (tetraoxane) of formaldehyde with a cyclic oligomer containing an oxyalkylene group having 2 to 4 carbon atoms such as ethylene oxide, 1,3-dioxolane, 1,3,6-trioxocane or 1,3-dioxepan.

The polyacetal resin used in the present invention is preferably a copolymer of a cyclic oligomer such as trioxane or tetraoxane and ethylene oxide or 1,3-dioxolane, more preferably a copolymer of trioxane and 1,3-dioxolane. The melt viscosity of the polyacetal resin is preferably 0.01 to 150 g/10 min in terms of melt index (MI) based on ASTM-D1238 (190° C., under a load of 2.16 kg).
(2) Polyethylene Wax (B)

The polyacetal resin composition of the present invention comprises a polyethylene wax (B) as an agent for improving friction-wear characteristics. By blending the polyethylene wax (B), the friction-wear characteristics, moldability and low-noise characteristics can be improved without impairing the excellent mechanical properties of the polyacetal resin.

The number average molecular weight of the polyethylene wax (B) is preferably 500 to 15,000, more preferably 500 to 12,000, much more preferably 1,000 to 10,000. When the number average molecular weight is 500 or higher, the occurrence of a bleed-out to the surface of a molded article can be prevented and when the number average molecular weight is 15,000 or lower, the friction-wear characteristics and moldability can be improved.

In the present invention, the number average molecular weight is a molecular weight in terms of polymethyl methacrylate measured by gel permeation chromatography.

In the present invention, the polyethylene wax (B) includes (B1) a polyethylene wax which is polyethylene having a number average molecular weight of 500 to 15,000 or a polyethylene copolymer, (B2) a polyethylene wax obtained by oxidation modifying the polyethylene wax (B1) and (B3) a modified polyethylene wax obtained by acid modifying the polyethylene wax (B1).

The polyethylene wax (B1) can be manufactured by (i) directly polymerizing ethylene or ethylene and an α-olefin in the presence of a Ziegler catalyst, (ii) obtained as a by-product when a high molecular weight polyethylene or copolymer thereof is manufactured, or (iii) by thermally decomposing a high molecular weight polyethylene or a copolymer thereof. Out of these, a copolymer type polyethylene wax obtained from 50 to 99 mol % of ethylene and 1 to 50 mol % of an α-olefin is preferred. The above α-olefin is preferably an olefin having 3 to 8 carbon atoms, more preferably propylene.

As for the above oxidation modification, the polyethylene wax (B2) is obtained by oxidation modification for introducing a polar group such as carboxyl group or hydroxyl group by treating the above polyethylene wax (B1) with a peroxide or oxygen. As for the above acid modification, the polyethylene wax (B3) is obtained by acid modification for introducing a polar group such as carboxyl group or sulfonic acid group by treating the polyethylene wax (B1) with an inorganic acid or an organic acid.

These polyethylene waxes (B) are marketed under the names of general type high-density polyethylene wax, general type low-density polyethylene wax, low acid number polyethylene wax, high acid number polyethylene wax, acid modified polyethylene wax or special monomer modified product and can be easily acquired from the market. Out of these, general type low-density polyethylene wax and low acid number type polyethylene wax are preferred.

The content of the polyethylene wax (B) in the polyacetal resin composition of the present invention is 0.1 to 10 parts by weight, preferably 0.5 to 5 parts by weight based on 100 parts by weight of the polyacetal resin (A). When the content of the polyethylene wax (B) is lower than 0.1 part by weight, the effect of improving friction-wear characteristics becomes unsatisfactory. When the content is higher than 10 parts by weight, problems such as the layer peeling of a molded product and an extrusion failure (such as a metering failure) at the time of manufacture may occur. Particularly when the number average molecular weight of the polyethylene wax (B) is low, the mechanical properties deteriorate, whereby problems such as the layer peeling of a molded article and an extrusion failure (such as a metering failure) at the time of manufacture readily occur.

The polyethylene waxes (B) may be used alone or in combination of two or more in any ratio.

(3) Silicone Oil (D)

The silicone oil (D) used in the present invention is a silicone oil having a kinetic viscosity at 25° C. of $50 \times 10^4$ cSt or more. This kinetic viscosity is particularly preferably $100 \times 10^4$ to $1,000 \times 10^4$ cSt. When the kinetic viscosity at 25° C. of the silicone oil (D) used in the present invention is lower than $50 \times 10^4$ cSt, the appearance and sliding property retention of the polyacetal resin composition of the present invention may deteriorate. The upper limit of the kinetic viscosity at 25° C. of the silicone oil is generally about $1,000 \times 10^4$ cSt.

As the silicone oil (D) used in the present invention may be used any conventionally known silicone oil. Specific examples of the silicone oil include a silicone oil composed of polydimethylsiloxane; substituted silicone oils obtained by substituting some or all of the methyl groups of polydimethylsiloxane by hydrogen, alkyl group having 2 or more carbon atoms, halogenated ester group such as phenyl group, halogenated phenyl group, ester group or fluorine, or polyether group; modified silicone oils having an epoxy group, amino group, alcoholic hydroxyl group or polyether group in addition to polydimethylsiloxane; alkyl aralkyl silicone oils containing a dimethylsiloxane unit and a phenylmethylsiloxane unit; and alkyl aralkyl polyether modified silicone oils having a siloxane unit having a structure that some of the methyl groups of the dimethylsiloxane unit are substituted by a polyether and a phenylmethylsiloxane unit. Out of these, a dimethylsiloxane polymer and a copolymer of dimethylsiloxane and methylphenylsiloxane are preferred.

The content of the silicone oil (D) in the polyacetal resin composition of the present invention is preferably 0.1 to 5 parts by weight, more preferably 0.2 to 3 parts by weight, particularly preferably 0.2 to 2 parts by weight based on 100 parts by weight of the polyacetal resin (A). When the above content is lower than 0.1 part by weight, the effect of improving friction-wear characteristics of the present invention becomes unsatisfactory and when the content is higher than 5 parts by weight, the moldability of the polyacetal resin composition is apt to deteriorate and the appearance tends to become worse.

The silicone oils (D) used in the present invention may be used alone or in combination of two or more in any ratio.

(4) Polyethylene Resin (C)

The polyethylene resin (C) used in the present invention is a polyethylene resin having a number average molecular weight of $2 \times 10^4$ to $50 \times 10^4$ which is higher than the number average molecular weight of the polyethylene wax (B). Examples of the polyethylene resin (C) include a low-density polyethylene, a linear low-density polyethylene which is a copolymer of ethylene and an α-olefin, and a super low-density polyethylene. Out of these, the low-density polyethylene is preferred. As the polyethylene resin (C), the low-density polyethylene resin (including a linear low-density polyethylene and a copolymer thereof) has a density of 0.910 to 0.940 g/cm³ and the super low-density polyethylene resin has a density of 0.875 g/cm³ or more and less than 0.910 g/cm³.

Since the low-density polyethylene has lower crystallinity than the high-density polyethylene, it is miscible with polyacetal to a certain degree, thereby further improving friction-wear characteristics advantageously.

The above polyethylene resin (C) may be obtained by polymerization using a conventional multi-site catalyst or single-site catalyst. Or it may be a polyethylene resin modified by an epoxy such as glycidyl methacrylate or an acid anhydride such as maleic anhydride.

The melt viscosity of the polyethylene resin (C) used in the present invention is preferably 0.01 to 150 g/10 min, more preferably 0.1 to 100 g/10 min in terms of melt index (MI) (measurement conditions: 190° C., under a load of 2.16 kg) based on ASTM-D1238.

When the melt index of the polyethylene resin (C) is lower than 0.01 g/10 min, the dispensability in the polyacetal resin of the polyethylene resin lowers, whereby friction-wear characteristics and mechanical properties may deteriorate. When the melt index is higher than 150 g/10 min, friction-wear characteristics may deteriorate.

The content of the polyethylene resin (C) in the polyacetal resin composition of the present invention is 0.1 to 10 parts by weight, preferably 0.5 to 5 parts by weight based on 100 parts by weight of the polyacetal resin (A). When the above content is higher than 10 parts by weight, the mechanical properties of the polyacetal resin composition deteriorate and when the content is lower than 0.1 part by weight, the effect of providing friction-wear characteristics synergistically becomes unsatisfactory. The polyethylene resins (C) may be used alone or in combination of two or more in any ratio.

In general, a silicone oil does not have high compatibility with or affinity for a polyacetal resin. To satisfy the requirements for friction-wear characteristics, a certain amount of the silicone oil must be added. However, when the amount of the silicone oil is large, the silicone oil oozes out to the surface of the resin at the time of molding the resin composition into a sliding part after the manufacture of the resin composition, thereby causing an extrusion (metering) failure due to a slip between resins or between the resin and a screw.

In the present invention, when the silicone oil (D) and the polyethylene wax (B) are used in combination as agents for improving friction-wear characteristics and a certain amount of a specific polyethylene resin (C) is used to solve the above problem, the dispersibilities of the silicone oil (D) and the polyethylene wax (B) in the polyacetal resin composition are enhanced and further, these improving agents are effectively retained in the resin composition with the result that extremely high friction-wear characteristics can be obtained due to the above synergistic function and effect even when the amount of the silicone oil (D) is relatively small.

To obtain the above effect, the content of the polyethylene resin (C) in the polyacetal resin composition of the present invention preferably falls within the above range. However, when higher friction-wear characteristics are required, it is preferred that a resin composition should be obtained by mixing a dispersion prepared by dispersing the silicone oil (D) into the polyethylene resin (C) with other components (polyacetal resin (A), polyethylene wax (B), etc.) and melt kneading them together. When this melt kneading method is employed and the resin composition is used in a sliding part, the wear loss can be significantly reduced.

Examples of this melt kneading method include (i) one in which the polyethylene resin (C) and the silicone oil (D) are melt kneaded together on an upstream side in an extruder and other components are side fed on a downstream side and (ii) one in which a master batch is molded by melt kneading together the polyethylene resin (C) and the silicone oil (D), mixed with other components and further melt kneaded with these components.

To manufacture the polyacetal resin composition of the present invention, the [(C)/(D)] weight ratio of the polyethylene resin (C) to the silicone oil (D) may be selected from among the above range according to use purpose. However, to improve both friction-wear characteristics for a resin composition molded article containing polyacetal and friction-wear characteristics for metals, the [(C)/(D)] weight ratio is preferably 30/70 to 75/25, particularly preferably 40/60 to 60/40.

The [(B)/((C)+(D))] weight ratio of the polyethylene wax (B) to the total of the polyethylene resin (C) and the silicone oil (D) is preferably 0.01 to 4, more preferably 0.05 to 2.

(5) Other Additives

Known additives and filler may be added to the polyacetal resin composition of the present invention in limits not prejudicial to the object of the present invention. The additives and filler which can be used in the present invention include a known thermoplastic polymer, antistatic agent, ultraviolet absorbent, optical stabilizer, carbon fiber, glass fiber, glass flake, talc, mica, calcium carbonate and potassium titanate whisker, etc.

(6) Process for Producing Polyacetal Resin Composition

The polyacetal resin composition according to the first aspect of the present invention can be manufactured in accordance with a known polyacetal resin molding method.

Mixing and kneading conditions and apparatuses are not particularly limited and any conventionally known conditions and apparatuses may be used. Kneading is preferably carried out at a temperature higher than the temperature at which the polyacetal resin melts, specifically, a temperature higher than the melting temperature of the polyacetal resin (A) as a raw material (generally 180° C. or higher).

When higher friction-wear characteristics are required, as described in the second aspect below, a resin composition may be obtained by mixing a dispersion prepared by dispersing the silicone oil (D) into the polyethylene resin (C) with the other components and melt kneading them together.

[2] Process for Producing Polyacetal Resin Composition

The process for producing a polyacetal resin composition according to the second aspect of the present invention is a process for producing a polyacetal resin composition comprising 100 parts by weight of (A) a polyacetal resin, 0.1 to 10 parts by weight of (B) a polyethylene wax having a number average molecular weight of 500 to 15,000, 0.1 to 10 parts by weight of (C) a polyethylene resin having a number average molecular weight of $2 \times 10^4$ to $50 \times 10^4$ and 0.1 to 5 parts by weight of (D) a silicone oil having a kinetic viscosity at 25° C. of $50 \times 10^4$ cSt or more, the process comprising mixing a dispersion prepared by dispersing the silicone oil (D) into the polyethylene resin (C) with other components and melt kneading them together.

The process for producing a polyacetal resin composition according to the above second aspect includes a production process comprising mixing a dispersion prepared by dispersing the silicone oil (D) into part of the polyethylene resin (C) with the other components (including the rest of the polyethylene resin (C)) and melt kneading them together when the dispersion prepared by dispersing the silicone oil (D) into the polyethylene resin (C) is to be mixed with other components and melt kneaded with these components.

(1) Production Apparatus and Conditions

In the process for producing a polyacetal resin composition according to the second aspect, the apparatus and conditions used for mixing and kneading are not particularly limited, and a conventionally known apparatus such as a kneader, Banbury mixer or extruder is used to mold the resin composition under known conditions. Melt kneading is preferably carried out at a temperature higher than the temperature at which the polyacetal resin melts, specifically, a temperature higher than the melting temperature of the polyacetal resin (A) as a raw material (generally 180° C. or higher).

(2) Production Process

When the dispersion prepared by dispersing the silicone oil (D) into the polyethylene resin (C) (or part of the polyethylene resin (C)) is mixed and melt kneaded with the other components, the friction-wear characteristics of the obtained polyacetal resin composition are dramatically improved.

The method of obtaining this polyethylene resin (C) dispersion of the silicone oil (D) is not particularly limited if the silicone oil (D) can be fully dispersed into the polyethylene resin (C). Examples of the method of molding the resin composition according to the second aspect of the present invention include (i) one in which the polyethylene resin (C) and the silicone oil (D) are melt kneaded together on an upstream side in an extruder, and the other components are side fed on a downstream side and (ii) one in which a master batch is molded by melt kneading together the polyethylene resin (C) and the silicone oil (D), mixed with other components and further melt kneaded with these components.

The polyethylene resin (C) dispersion of the silicone oil (D) can be manufactured by kneading together the polyethylene resin (C) and the silicone oil (D) by means of a kneader, Banbury mixer or extruder.

The [(C)/(D)] weight ratio of the polyethylene resin (C) to the silicone oil (D) when the polyethylene resin (C) dispersion of the silicone oil (D) is to be obtained is preferably 30/70 to 75/25, more preferably 40/60 to 60/40. In this case, in the polyethylene resin (C) dispersion of the silicone oil (D), the polyethylene resin (C) preferably forms a continuous phase. To improve both friction-wear characteristics for a resin composition molded article containing polyacetal and friction-wear characteristics for metals, the [(C)/(D)] weight ratio of the polyethylene resin (C) to the silicone oil (D) preferably falls within the above range.

The [(B)/((C)+(D))] weight ratio of the polyethylene wax (B) to the total of the polyethylene resin (C) and the silicone oil (D) is preferably 0.01 to 4, more preferably 0.05 to 2.

[3] Polyacetal Resin Sliding Member

The polyacetal resin sliding member according to the third aspect of the present invention will be described hereinbelow.

The polyacetal resin composition of the present invention can be molded by a known polyacetal resin molding method. Molded articles obtained by using the polyacetal resin composition of the present invention include various products which are known as polyacetal resin molding applications, such as materials for round bars and thick plates, and parts for sheets, tubes, vessels, machines, electric equipment, automobiles and construction materials.

Out of these, the polyacetal resin moldings of the present invention provide an excellent effect as sliding members. Stated more specifically, the moldings include sliding members such as bearings, gears, cams, rollers, sliding plates, pulleys, levers and guides, etc. which are aimed to have high quality required in the fields of electric and electronic equipment, office equipment, automobiles and industrial equipment, etc.

The polyacetal resin sliding member of the present invention may be used with not only a sliding member of the present invention but also other resin sliding members, fiber reinforced resin sliding members, ceramic and metallic sliding members. The shape of the sliding member and the counter material may be suitably selected from conventional known shapes and materials.

EXAMPLES

The following examples and comparative examples are provided for the purpose of further illustrating the present invention but are in no way to be taken as limiting. The evaluation methods and the materials used in the evaluation methods are as follows.

(1) Measurement of Dynamic Frictional Coefficient (i) Molding of a Test Sample

Polyacetal resin compositions to be evaluated and counter materials (except the following steel material (d)) were molded into cylindrical thrust test samples (size: 25.6 mm in outer diameter×20.0 mm in inner diameter×15.0 mm in height) by injection molding at a cylinder temperature of 200° C. and a mold temperature of 80° C. Only in the case of glass fiber reinforced polybutylene terephthalate, the cylinder temperature was set to 260° C. The following materials were used as the counter sliding materials.

(i-1) Own Materials

The resin compositions (resin compositions (a1)) of Examples and the resin compositions (resin compositions (a2) of Comparative Examples which will be described hereinafter were used as own materials.

(i-2) Counter Materials

The following resin (b), resin composition (c) and steel material (d) were used as counter materials.

(b) polyacetal resin (resin (b)) (manufactured by Mitsubishi Engineering-Plastics Co., Ltd., trade name: Iupital F20-03 (standard polyacetal resin containing no reinforcement))

(c) glass fiber reinforced polybutylene terephthalate resin (expressed as GF reinforced PBT in Tables 1 and 2) (composition (c)) (manufactured by Mitsubishi Engineering-Plastics Co., Ltd., trade name: NOVADURAN 5010G30 (content of glass fibers: 30 wt %))

(d) carbon steel material (steel material (d)) (JIS G4051: 2005 standardized carbon steel material S45C for mechanical structures, surface roughness Ra of 0.3 μm, Rmax of 2.5 μm)

(ii) Frictional Wear Tester

A thrust type frictional wear tester manufactured by Orientec Co., Ltd. was used.

(iii) Evaluation Method

The above injection molded test samples and the steel material (d) which have the same cylindrical shape, were used as thrust test samples for the own materials and the counter materials. The end faces of the own material and the counter material were butted against each other and arranged horizontal in such a manner that the own material overlay the counter material. The own material on the upper side was fixed and the counter material on the lower side was turned in the circumferential direction to obtain a dynamic frictional coefficient (μ).

As for measurement conditions, the counter material was turned at a temperature of 23° C., a humidity of 50%, a face pressure of 0.5 MPa and an average inner diameter linear velocity of 0.1 m/sec.

(2) Specific Wear Loss

The same cylindrical thrust test samples and tester as those used in (1) were used and the counter material was turned for 20 hours at a temperature of 23° C., a humidity of 50%, a face pressure of 0.15 MPa and an average inner diameter linear velocity of 0.3 m/sec to obtain a specific wear loss.

The unit of the specific wear loss was [×$10^{-2}$ mm$^3$/kg·km] and the counter sliding materials were the resin composition (a1) or the resin composition (a2), the resin (b), the resin composition (c) and the steel material (d) as in (1). Only in the case of the steel material, the face pressure was set to 0.5 MPa.

When sliding members made of the resin composition (a1) or the resin composition (a2) were used, the specific wear loss was the average value of the both materials (the own material and the counter material) shown in Tables 1 and 2.

(3) The Polyacetal Resin, Polyethylene Wax, Polyethylene Resin and Silicone Oil Used in Examples and Comparative Examples are Shown Below.

(i) Polyacetal Resin

A-1: polyacetal resin which is an oxymethylene copolymer of trioxane and 1,3-dioxolane and contains 0.5 mol % of an oxyethylene unit (melt index (MI): 30 g/10 min)

MI was measured in accordance with ASTM-D1238 (190° C., under a load of 2.16 kg) (the same shall apply hereinbelow)

A-2: polyacetal resin which is an oxymethylene copolymer of trioxane and 1,3-dioxolane and contains 1.5 mol % of an oxyethylene unit (MI: 30 g/10 min)

A-3: polyacetal resin which is an oxymethylene copolymer of trioxane and 1,3-dioxolane and contains 4.0 mol % of an oxyethylene unit (MI: 30 g/10 min)

(ii) Polyethylene Wax

B-1: general low-density type, acid number of 0 (mgKOH/g), ethylene-propylene copolymer type (manufactured by Mitsui Chemical Co., Ltd., trade name: Hiwax 410P, molecular weight of 4,000)

B-2: low acid number type, acid number of 1 (mgKOH/g) (manufactured by Mitsui Chemical Co., Ltd., trade name: Hiwax 405MP, molecular weight of 4,000)

B-3: high acid number type, acid number of 25 (mgKOH/g), (manufactured by Clariant Japan K.K., trade name: Ricowax 522, molecular weight of 3,000)

(iii) Polyethylene Resin

C-1: low-density polyethylene (density of 0.916 g/cm$^3$, number average molecular weight of 22,000) (manufactured by Nippon Unicar Co., Ltd., trade name: NUC-8350, MI: 18 g/10 min)

MI was measured in accordance with JIS K6922-2 (the same shall apply hereinbelow).

C-2: linear low-density polyethylene (copolymer of ethylene and butene, density of 0.926 g/cm$^3$, number average molecular weight of 29,000) (manufactured by Nippon Unicar Co., Ltd., trade name: NUC-G5371, MI: 12 g/10 min)

C-3: super low-density polyethylene (copolymer of ethylene and butene, density of 0.900 g/cm$^3$, number average molecular weight of 37,000) (manufactured by Nippon Unicar Co., Ltd., trade name: DFDB9042, MI: 5 g/10 min)

(iv) Silicone Oil

D-1: kinetic viscosity at 25° C. of 100×$10^4$ cSt (manufactured by Shin-Etsu Chemical Co., Ltd., polydimethylsiloxane, trade name: KF-96-1000000CS)

D-2: kinetic viscosity at 25° C. of 50×$10^4$ cSt (manufactured by Shin-Etsu Chemical Co., Ltd., polydimethylsiloxane, trade name: KF-96-500000CS)

D-3: kinetic viscosity at 25° C. of 15×$10^4$ cSt (manufactured by Shin-Etsu Chemical Co., Ltd., polydimethylsiloxane, trade name: KF-96-150000CS)

Examples 1 to 10

The polyacetal resin, polyethylene wax, polyethylene resin and silicone oil were mixed together in a ratio shown in Table 1 by using a super mixer (manufactured by Kawata Co., Ltd.) and then a resin composition (resin composition (a1)) (pellet) was obtained by using a double-screw extruder (manufactured by Ikegai Ironworks Co., Ltd., model: PCM-30). Thereafter, cylindrical thrust test samples were molded from this resin composition by using an injection molding machine to evaluate their dynamic frictional coefficients and specific wear losses. The evaluation results are shown in Table 1.

The resin compositions (pellets) were molded by the following two processes (the same as in Comparative Examples 1 to 6).

The first process in which the polyacetal resin, polyethylene wax, polyethylene resin and silicone oil were mixed together and melt kneaded together by means of a double-screw extruder and the obtained resin composition (pellet) was molded is expressed as "resin composition production process (1)" in Table 1 (same as in Table 2). The second process in which the polyethylene resin and the silicone oil were mixed and kneaded together in advance to obtain a master batch (pellet) containing the silicone oil dispersed in the polyethylene resin, the master batch (pellet) was then mixed with the polyacetal resin and the polyethylene wax, and the resulting mixture was kneaded by means of a double-screw extruder to mold a resin composition (pellet) is expressed as "resin composition production process (2)" in Table 1.

Comparative Examples 1 to 6

After the components were mixed together in a ratio shown in Table 2 in the same manner as in the above Examples, the resulting mixture was melt kneaded by means of a double-screw extruder to mold a resin composition (resin composition (a2)) (pellet). Thereafter, test samples were molded from this resin composition by injection molding and evaluated. The evaluation results are shown in Table 2.

TABLE 1

| | Example No. | | | 1 | 2 | 3 | 4 | 5 |
|---|---|---|---|---|---|---|---|---|
| 1. resin composition (a1) | | | | | | | | |
| (1) polyacetal resin | (parts by weight) | | A-1 | — | — | — | — | — |
| | | | A-2 | 100 | 100 | 100 | 100 | 100 |
| | | | A-3 | — | — | — | — | — |
| (2) polyethylene wax | (parts by weight) | | B-1 | 1 | 1 | 1 | 1.5 | — |
| | | | B-2 | — | — | — | — | 0.5 |
| | | | B-3 | — | — | — | — | — |
| (3) polyethylene resin | (parts by weight) | | C-1 | 1 | 1 | 1.5 | 1.25 | 1 |
| | | | C-2 | — | — | — | — | — |
| | | | C-3 | — | — | — | — | — |
| (4) silicone oil | (parts by weight) | | D-1 | 1 | 1 | 0.5 | 1.25 | — |
| | | | D-2 | — | — | — | — | 1.5 |
| 2. resin composition production process (a1) | | | | (2) | (1) | (2) | (2) | (2) |
| 3. evaluation results | | | | | | | | |
| (1) between own materials [resin composition(a1)] | dynamic frictional coefficient | (μ) | | 0.15 | 0.16 | 0.18 | 0.16 | 0.16 |
| | specific wear loss ($\times 10^{-2}$ mm$^3$/kg · km) | | | <1 | <1 | <1 | <1 | <1 |
| (2) counter materials | | | | | | | | |
| (i) polyacetal resin [resin(b)] | dynamic frictional coefficient | (μ) | | 0.17 | 0.18 | 0.20 | 0.17 | 0.17 |
| | specific wear loss ($\times 10^{-2}$ mm$^3$/kg · km) | own material | | 1.3 | 10.7 | 2.8 | 1.1 | 1.8 |
| | | counter material | | <1 | 3.8 | <1 | <1 | <1 |
| (ii) GF reinforced PBT [composition(c)] | dynamic frictional coefficient | (μ) | | 0.09 | 0.10 | 0.10 | 0.09 | 0.11 |
| | specific wear loss ($\times 10^{-2}$ mm$^3$/kg · km) | own material | | 2.9 | 8.6 | 4.0 | 2.7 | 3.2 |
| | | counter material | | <1 | 1.2 | <1 | <1 | <1 |
| (iii) carbon steel material [steel material(d)] | dynamic frictional coefficient | (μ) | | 0.15 | 0.15 | 0.17 | 0.16 | 0.18 |
| | specific wear loss ($\times 10^{-2}$ mm$^3$/kg · km) | own material | | 2.5 | 2.6 | 3.5 | 2.1 | 1.9 |
| | | counter material | | — | — | — | — | — |

| | Example No. | | | 6 | 7 | 8 | 9 | 10 |
|---|---|---|---|---|---|---|---|---|
| 1. resin composition (a1) | | | | | | | | |
| (1) polyacetal resin | (parts by weight) | | A-1 | — | — | — | 100 | — |
| | | | A-2 | 100 | 100 | 100 | — | — |
| | | | A-3 | — | — | — | — | 100 |
| (2) polyethylene wax | (parts by weight) | | B-1 | — | — | — | 0.5 | — |
| | | | B-2 | 0.5 | 1.5 | - | — | 1 |
| | | | B-3 | — | — | 2 | — | — |
| (3) polyethylene resin | (parts by weight) | | C-1 | 1 | — | — | — | 1 |
| | | | C-2 | — | 0.5 | — | — | — |
| | | | C-3 | — | — | 1.5 | 1.5 | — |
| (4) silicone oil | (parts by weight) | | D-1 | — | 1 | 0.5 | 1 | — |
| | | | D-2 | 1.5 | — | — | — | 1 |
| 2. resin composition production process (a1) | | | | (1) | (2) | (2) | (2) | (2) |
| 3. evaluation results | | | | | | | | |
| (1) between own materials [resin composition(a1)] | dynamic frictional coefficient | (μ) | | 0.17 | 0.17 | 0.18 | 0.15 | 0.17 |
| | specific wear loss ($\times 10^{-2}$ mm$^3$/kg · km) | | | <1 | <1 | <1 | <1 | <1 |

TABLE 1-continued

| (2) counter materials | | | | | | | | |
|---|---|---|---|---|---|---|---|---|
| (i) polyacetal resin [resin(b)] | dynamic frictional coefficient | ($\mu$) | | 0.18 | 0.18 | 0.20 | 0.18 | 0.19 |
| | specific wear loss ($\times 10^{-2}$ mm$^3$/kg · km) | own material | | 8.5 | 2.4 | 2.6 | 1.5 | 2.1 |
| | | counter material | | 3.1 | <1 | <1 | <1 | <1 |
| (ii) GF reinforced PBT [composition(c)] | dynamic frictional coefficient | ($\mu$) | | 0.11 | 0.10 | 0.11 | 0.10 | 0.11 |
| | specific wear loss ($\times 10^{-2}$ mm$^3$/kg · km) | own material | | 9.5 | 3.7 | 4.6 | 4.2 | 5.1 |
| | | counter material | | 1.2 | <1 | <1 | <1 | <1 |
| (iii) carbon steel material [steel material(d)] | dynamic frictional coefficient | ($\mu$) | | 0.18 | 0.19 | 0.17 | 0.18 | 0.19 |
| | specific wear loss ($\times 10^{-2}$ mm$^3$/kg · km) | own material | | 2.1 | 2.7 | 3.2 | 2.3 | 2.9 |
| | | counter material | | — | — | — | — | — |

TABLE 2

| Comparative Example No. | | | | 1 | 2 | 3 | 4 | 5 | 6 |
|---|---|---|---|---|---|---|---|---|---|
| 1. resin composition (a2) | | | | | | | | | |
| (1) polyacetal resin | (parts by weight) | | A-2 | 100 | 100 | 100 | 100 | 100 | 100 |
| (2) polyethylene wax | (parts by weight) | | B-1 | 1 | 2 | — | — | — | — |
| | | | B-2 | — | — | 1 | — | 1 | 2.5 |
| (3) polyethylene resin | (parts by weight) | | C-1 | 0.05 | — | — | — | — | — |
| | | | C-2 | — | 1.5 | — | — | — | 1 |
| | | | C-3 | — | — | — | 2 | — | — |
| (4) silicone oil | (parts by weight) | | D-1 | 0.05 | — | 2 | 1.5 | — | — |
| | | | D-2 | — | — | — | — | — | 8 |
| | | | D-3 | — | — | — | — | 1 | — |
| 2. resin composition production process (a2) | | | | (1) | (1) | (1) | (1) | (1) | (1) |
| (1) between own materials [resin composition(a2)] | dynamic frictional coefficient | ($\mu$) | | 0.21 | 0.18 | 0.17 | 0.18 | 0.17 | A bleed-out and peeling occurred during injection molding. It cannot be used as an evaluation sample. |
| | specific wear loss ($\times 10^{-2}$ mm$^3$/kg · km) | | | 120 | 45.6 | 1.1 | 6.0 | 12.5 | |
| (2) counter materials | | | | | | | | | |
| (i) polyacetal resin [resin(b)] | dynamic frictional coefficient | ($\mu$) | | 0.25 | 0.21 | 0.21 | 0.20 | 0.22 | |
| | specific wear loss ($\times 10^{-2}$ mm$^3$/kg · km) | own material | | 150 | 84.5 | 32.7 | 37.4 | 42.5 | |
| | | counter material | | 12.5 | 8.7 | 6.2 | 6.3 | 6.5 | |
| (ii) GF reinforced PBT [composition(c)] | dynamic frictional coefficient | ($\mu$) | | 0.13 | 0.10 | 0.11 | 0.12 | 0.11 | |
| | specific wear loss ($\times 10^{-2}$ mm$^3$/kg · km) | own material | | 43.0 | 34.5 | 19.5 | 10.5 | 26.8 | |
| | | counter material | | 1.5 | 1.2 | 1.1 | 1.2 | 1.1 | |
| (iii) carbon steel material [steel material(d)] | dynamic frictional coefficient | ($\mu$) | | 0.22 | 0.20 | 0.18 | 0.19 | 0.18 | |
| | specific wear loss ($\times 10^{-2}$ mm$^3$/kg · km) | own material | | 18.9 | 10.6 | 12.5 | 9.7 | 8.4 | |
| | | counter material | | — | — | — | — | — | |

It was confirmed from Tables 1 and 2 that when a resin sliding member obtained by molding the polyacetal resin composition of the present invention comes into slide contact with a sliding member molded from the polyacetal resin composition of the present invention and even when it comes into slide contact with another resin sliding member, fiber reinforced resin composition slide member and metal sliding member, the dynamic frictional coefficient can be reduced and the wear losses of sliding members made from the polyacetal resin composition of the present invention (own material) and the counter sliding material (counter material) can be significantly reduced.

It was also confirmed that when the polyacetal resin composition of the present invention is to be molded, the polyacetal resin compositions (Examples 1 and 5) obtained by mixing and melt kneading a dispersion prepared by dispersing the silicone oil into the polyethylene resin with other components according to the second aspect of the present invention are much superior to polyacetal resin compositions (Examples 2 and 6) obtained by mixing and melt kneading together the polyacetal resin, polyethylene wax, polyethylene resin and silicone oil in friction-wear characteristics.

INDUSTRIAL FEASIBILITY

The polyacetal resin composition of the present invention can be advantageously used as parts which require friction-wear characteristics in a wide variety of fields including electric and electronic equipment, office equipment, automobiles and industrial equipment.

Since the polyacetal resin sliding member of the present invention has extremely excellent friction-wear characteristics, it can be widely used as a sliding part material for bearings, gears, cams, rollers, sliding plates, pulleys, levers and guides.

What is claimed is:

1. A process for producing a polyacetal resin composition comprising 100 parts by weight of (A) a polyacetal resin, 0.1 to 10 parts by weight of (B) a polyethylene wax having a number average molecular weight of 500 to 15,000, 0.1 to 10 parts by weight of (C) a polyethylene resin having a number average molecular weight of $2 \times 10^4$ to $50 \times 10^4$, and 0.1 to 5 parts by weight of (D) a silicone oil having a kinetic viscosity at 25° C. of $50 \times 10^4$ cSt or more, the process comprising mixing a dispersion prepared by dispersing the silicone oil (D) into the polyethylene resin (C) with other components and melt kneading them together.

2. The process for producing a polyacetal resin composition according to claim 1, wherein the [C]/[D] weight ratio of the polyethylene resin (C) to the silicone oil (D) when the polyethylene resin (C) dispersion of the silicone oil (D) is to be obtained is 30/70 to 75/25 and the [(B)/((C)+(D))] weight ratio of the polyethylene wax (B) to the total of the polyethylene resin (C) and the silicone oil (D) is 0.01 to 4.

3. A polyacetal resin composition comprising 100 parts by weight of (A) a polyacetal resin, 0.1 to 10 parts by weight of (B) a polyethylene wax having a number average molecular weight of 500 to 15,000, 0.1 to 10 parts by weight of (C) a polyethylene resin having a number average molecular weight of $2\times10^4$ to $50\times10^4$, and 0.1 to 5 parts by weight of (D) a silicone oil having a kinetic viscosity at 25° C. of $50\times10^4$ cSt or more, the resin composition made by the steps of mixing and kneading the polyethylene resin (C) and silicone oil (D) to obtain a dispersion composition of the silicone oil (D) dispersed into the polyethylene resin (C), and subsequently mixing and kneading the dispersion composition with the polyacetal resin (A) and the polyethylene wax (B).

4. The polyacetal resin of claim 3, wherein the polyethylene resin (C) is at least one selected from a low-density polyethylene having a density of 0.910 to 0.940 g/cm$^3$, a linear low-density polyethylene having a density of 0.910 to 0.940 g/cm$^3$ obtained by copolymerizing ethylene with an α-olefin, and a super low-density polyethylene having a density of 0.875 g/cm$^3$ or more and less than 0.910 g/cm$^3$.

* * * * *